US008605169B2

(12) United States Patent
Nishide

(10) Patent No.: US 8,605,169 B2
(45) Date of Patent: Dec. 10, 2013

(54) SOLID-STATE IMAGING DEVICE WITH DELAYED REFLECTION OF GAIN SETTING AND CAMERA SYSTEM WITH SAME

(75) Inventor: Tsutomu Nishide, Tokyo (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 12/672,446

(22) PCT Filed: Jun. 1, 2009

(86) PCT No.: PCT/JP2009/059964
§ 371 (c)(1),
(2), (4) Date: Feb. 5, 2010

(87) PCT Pub. No.: WO2009/154073
PCT Pub. Date: Dec. 23, 2009

(65) Prior Publication Data
US 2011/0085064 A1    Apr. 14, 2011

(30) Foreign Application Priority Data

Jun. 18, 2008 (JP) .................................. 2008-159471

(51) Int. Cl.
*H04N 5/235* (2006.01)
(52) U.S. Cl.
USPC ........................................ 348/229.1; 348/296
(58) Field of Classification Search
USPC ........... 348/294, 229.1, 230.1, 255, 296, 308, 348/207.99; 250/208.1; 257/291, 292
See application file for complete search history.

(56) References Cited

U.S. PATENT DOCUMENTS

| 6,567,123 | B1 * | 5/2003 | Hashimoto ................ 348/229.1 |
| 6,836,288 | B1 | 12/2004 | Lewis |
| 6,920,078 | B2 | 7/2005 | Cho |
| 2004/0095495 | A1 * | 5/2004 | Inokuma et al. .............. 348/308 |

(Continued)

FOREIGN PATENT DOCUMENTS

| EP | 1 727 360 | 11/2006 |
| JP | 06-038097 | 2/1994 |

(Continued)

OTHER PUBLICATIONS

International Search Report dated Sep. 1, 2009.

(Continued)

*Primary Examiner* — Nelson D. Hernández Hernández
*Assistant Examiner* — Dennis Hogue
(74) *Attorney, Agent, or Firm* — Dentons US LLP

(57) ABSTRACT

A solid-state imaging device and a camera system capable of preventing the occurrence of invalid frames if a shutter and a gain are simultaneously set. The solid-state imaging device has a picture element array block on which a plurality of picture element circuits having features for converting an optical signal into an electrical signal and accumulating the electrical signal in accordance with an exposure time are arranged in a matrix manner, a picture element drive block drivable so as to execute a shutter operation of said picture element block and a read operation in accordance with setting data, and an interface section including functions of holding shutter setting data and gain setting data supplied from the outside and controlling a timing for reflecting shutter setting and gain setting onto at least said picture element drive block.

7 Claims, 15 Drawing Sheets

(56) References Cited

U.S. PATENT DOCUMENTS

| | | | |
|---|---|---|---|
| 2005/0099508 A1* | 5/2005 | Oda et al. | 348/229.1 |
| 2005/0116251 A1* | 6/2005 | Abe et al. | 257/146 |
| 2005/0140795 A1* | 6/2005 | Hisamatsu et al. | 348/222.1 |
| 2005/0243185 A1* | 11/2005 | Son et al. | 348/222.1 |
| 2007/0085921 A1* | 4/2007 | Kitagata et al. | 348/308 |
| 2008/0002038 A1* | 1/2008 | Suwa | 348/229.1 |
| 2009/0086076 A1* | 4/2009 | Nishide et al. | 348/308 |

FOREIGN PATENT DOCUMENTS

| | | |
|---|---|---|
| JP | 10-210367 | 8/1998 |
| JP | 11-113008 | 4/1999 |
| JP | 2004-166269 | 6/2004 |

OTHER PUBLICATIONS

Supplemental European Search Report dated Aug. 24, 2000 in connection with counterpart EP Application No. 09 766 521.

* cited by examiner

US 8,605,169 B2

SOLID-STATE IMAGING DEVICE WITH DELAYED REFLECTION OF GAIN SETTING AND CAMERA SYSTEM WITH SAME

TECHNICAL FIELD

The present invention relates to a solid-state imaging device typified by a CMOS image sensor and a camera system.

BACKGROUND ART

Recently, CMOS image sensors have been attracting attention as solid-stage imaging devices (image sensors) for CCDs.

This is because CMOS image sensors are able to overcome the following problems.

Namely, dedicated processes are required for the manufacture of CCD pictures elements, an operation of CCD picture elements requires a plurality of power supply voltages, and a plurality of peripheral ICs must be operated in combination.

Such CCDs involve various problems such as making a system very complicated, which can be solved by CMOS image sensors.

For the manufacture of CMOS image sensors, the same manufacturing processes as those used for general-purpose CMOS integrated circuits may be used. It is also practical to install, on a same chip, an analog circuit and a logic circuit that can be driven by a single power supply and are based on the CMOS process.

For the above-mentioned reasons, the CMOS image sensor provides a plurality of great merits, such as the reduced number of peripheral ICs.

An output circuit of the CCD is mainly one-channel (ch) output that uses an FD amplifier having an FD (Floating Diffusion).

In contrast, the CMOS image sensor has an FD amplifier for each picture element and the output thereof is mainly a column parallel output type in which a certain row in a picture array is selected and the selected row is simultaneously read in the column direction.

This is because it is difficult to get sufficient drive capabilities with the FD amplifier arranged in a picture element and, therefore, it is necessary to lower data rate, for which parallel processing is considered advantageous.

And, with CMOS image sensors, resetting picture elements in general is executed often by a method in which picture elements are sequentially reset for each row.

This method is referred to as a rolling shutter.

FIG. 1 shows a diagram illustrating an example of an CMOS image sensor configured by four transistors.

This picture element 1 has a photoelectric conversion element 11 based on a photo diode, for example, and, for this one photoelectric conversion element 11, has four transistors of a transfer transistor 12, a reset transistor 13, an amplification transistor 14, and a selection transistor 15 as active elements.

The photoelectric conversion element 11 photoelectrically converts an incident light into a charge (here, the electron) having an amount corresponding to the amount of the incident light.

The transfer transistor 12 is connected between the photoelectric conversion element 11 and a floating diffusion FD and a transmission signal (a drive signal) TG is given to its gate (transfer gate) through a transfer control line LTx.

Consequently, the electron obtained by the photoelectric conversion by the photoelectric conversion element 11 are transferred to the floating diffusion FD.

The reset transistor 13 is connected between a power supply line LVDD and the floating diffusion FD and a rest signal RST is given to its gate through a reset control line LRST.

Consequently, a potential of the floating diffusion FD is reset to a potential of the power supply line LDVV.

The floating diffusion FD is connected with the gate of the amplification transistor 14. The amplification transistor 14 is connected to a signal line 16 via the selection transistor 15 to configure a constant current source and a source follower outside the picture element.

Then, an address signal (a selection signal) SEL is given to the gate of the selection transistor 15 through a selection control line LSEL, thereby turning on the selection transistor 15.

When the selection transistor 15 is turned on, the amplification transistor 14 amplifies the potential of the floating diffusion FD and outputs a voltage corresponding to the potential to the signal line 16. Through the signal line 16, voltage outputted from each picture element is outputted to a column circuit (a column processing circuit).

This picture element reset operation denotes that the charge accumulated in the photoelectric conversion element 11 is transferred to the floating diffusion FD for discharge by turning on the transfer transistor 12.

At this moment, the floating diffusion FD has discharged the charge on the power supply side in advance by turning on the reset transistor 13, thereby making ready for receive the charge of the photoelectric conversion element 11. Alternatively, the charge may be discharged directly to the power supply, while the transfer transistor 12 is on by concurrently turning on the reset transistor 13.

The sequence of these operations is simply referred to as "a picture element reset operation" or "a shutter operation."

On the other hand, in a read operation, the reset transistor 13 is first turned on to reset the floating diffusion FD and an excess charge (noise) is outputted to the signal line 16 through the selection transistor 15 turned on in that state. This is referred to as a P-phase output.

Next, the transfer transistor 12 is turned on to transfer a charge accumulated in the photoelectric conversion element 11 to the floating diffusion FD and its output is outputted to the signal line 16. This is referred to as a D-phase output.

Outside the picture element circuit, a difference between the D-phase output and the P-phase output is obtained and the reset noise of the floating diffusion FD is canceled, thereby providing an image signal.

For simplicity, the sequence of the these operations is simply referred to as "a picture element read operation."

FIG. 2 is a diagram illustrating a general configuration example of a CMOS image sensor (a solid-state imaging device) with the picture element shown in FIG. 1 arranged in a two-dimensional array.

A CMOS image sensor 20 shown in FIG. 2 is configured by a picture element array block 21 in which the picture element circuit shown in FIG. 1 is arranged in a two-dimensional array, a picture element drive circuit (a vertical scan circuit) 22, and a column circuit (a column processing circuit) 23.

The picture element drive circuit 22 controls on/off of the transfer transistor 12, the reset transistor 13, and the selection transistor 15 of the picture elements of each row.

The column circuit 23 is a circuit that receives data of the picture element row read by the picture element drive circuit 22 and transfers the data to a signal processing circuit of a subsequent stage.

FIG. 3 is a diagram illustrating a timing chart of a rolling shutter operation of the circuit shown in FIG. 2.

As shown in FIG. 3, a picture element reset operation is row-sequentially executed and, by following this operation, a picture element read operation is row-sequentially executed.

The picture elements of each row accumulate each a signal in the photoelectric conversion element during a picture element reset operation and a picture element read operation, the signal being read by the picture element read operation.

Meanwhile, when a backlit scene or a scene having a great luminance difference of contrast is taken, a camera having a imaging device as described above causes white-out or black-out with a standard image with exposure time matched with the luminance of a subject.

So, dynamic range expansion is executed by taking a plurality of non-standard images having different exposure times and replacing areas too bright or dark in a standard image by an image obtained by applying a synthetic gain to the non-standard images, thereby executing compression in accordance with output bits.

For example, in the processing called wide dynamic range (WD), images having wide dynamic ranges (DR) are obtained by multiple exposures and the synthesis of plural images and the compression of dynamic ranges (DR) are executed.

PRIOR ART DOCUMENT

Patent Document

Patent Document 1: Japanese Patent Laid-Open No. 2004-166269

SUMMARY OF INVENTION

Technical Problem

Now, in order to set an exposure ratio between the low luminance side and the high luminance side by wide dynamic range driving, it has become necessary to set not only the shutter but also the gain.

However, prior-art technologies present a problem that the simultaneous setting of the shutter and the gain causes invalid frames.

With prior-art technologies, if the gain setting is reflected by an update timing after register communication, the gain setting is reflected to that frame.

There is no problem with the change of gain setting alone.

However, if the shutter setting and the gain setting are executed in a same communication period, the shutter setting is reflected one frame after the gain reflected to that frame, so that, as shown in FIG. 4, a problem occurs that one invalid frame is generated.

It is possible for prior-art technologies to solve the problem of generating the invalid frame.

A countermeasure is technique that the gain setting is executed in a frame next to a frame on which the shutter setting was executed, as shown in FIG. 5.

However, with this technique, it is necessary to execute communication two times, one for the shutter setting and the other for the gain setting, thus making the setting time-consuming.

Also, in the case of an operation requiring a plurality of frames, such as wide dynamic range driving, executing the shutter setting and the gain setting with a start frame as shown in FIG. 6, there likewise occurs problem that the previous one frame becomes an invalid frame.

Hence, a plurality of frames realizing wide dynamic range driving are invalidated.

It is therefore an object of the present invention to provide a solid-state imaging device and a camera system that can prevent invalid frames from being generated if the shutter and the gain are set at the same time.

Technical Solution

In carrying out the invention and according to a first aspect thereof, there is provided a solid-state imaging device including: a picture element block on which a plurality of picture element circuits having features for converting an optical signal into an electrical signal and accumulating the electrical signal in accordance with an exposure time are arranged in a matrix manner; a picture element drive block drivable so as to execute a shutter operation of the picture element block and a read operation in accordance with setting data; and an interface section including functions of holding shutter setting data and gain setting data supplied from the outside and controlling a timing for reflecting shutter setting and gain setting onto at least the picture element drive block. The interface section includes a function of reflecting a gain onto a frame next to one frame after setting.

The above-mentioned interface section has functions of detecting drive of a plurality of frames and delaying the reflection of one frame gain.

Suitably, the above-mentioned interface section has a switch unit configured to execute selection between executing the reflection of a gain setting value by delaying by one frame and executing the reflection without delaying by one frame.

Suitably, the above-mentioned interface section has a data hold unit configured to hold shutter setting data and gain setting data supplied from the outside, a delay update timing generation unit configured to receive an update timing signal to generate one-frame delay update timing signal, a gain hold unit configured to receive the delay update timing signal to output gain setting value to be supplied by delaying by one frame, and a reflection control unit configured to receive the update timing signal to directly output shutter setting value held in the data hold unit and supply gain setting value to the gain hold unit.

Suitably, the above-mentioned interface section has a data hold unit configured to hold shutter setting data and gain setting data supplied from the outside, a delay update timing generation unit configured to receive an update timing signal to generate one-frame delay update timing signal, a gain hold unit configured to receive the delay update timing signal to output gain setting value to be supplied by delaying by one frame, a reflection control unit configured to receive the update timing signal to directly output a shutter setting value and a gain setting value held in the data hold unit and supply a gain setting value to the gain hold unit, and a switch unit configured to selectively output a gain setting value not delayed that is outputted from the reflection control unit or a gain setting value delayed by the gain hold unit.

In carrying out the invention and according to another aspect thereof, there is provided a camera system including: a solid-state imaging device; an optical system for forming a subject image on the imaging device; and a signal processing circuit configured to process an output image signal of the imaging device; wherein the solid-state imaging device has a picture element block on which a plurality of picture element circuits having features for converting an optical signal into an electrical signal and accumulating the electrical signal in accordance with an exposure time are arranged in a matrix manner; a picture element drive block drivable so as to execute a shutter operation of the picture element block and a read operation in accordance with setting data; and an interface section including functions of holding shutter setting data and gain setting data supplied from the outside and controlling a timing for reflecting shutter setting and gain setting onto at least the picture element drive block, the above-mentioned interface section including a function of reflecting a gain onto a frame next to one frame after setting.

According to the present invention, shutter setting data and gain setting data are entered from the outside to an interface section and held.

And, in reflecting shutter setting and gain setting, the interface section directly reflects a shutter setting value without delay and reflects a gain on a frame next to one frame after setting of a gain setting value.

Advantageous Effect

According to the present invention, the occurrence of invalid frames can be prevented even if shutter and gain are simultaneously set.

MODES FOR CARRYING OUT THE INVENTION

The following describes embodiments of the present invention with reference to drawings accompanied hereto.

Figure 1:
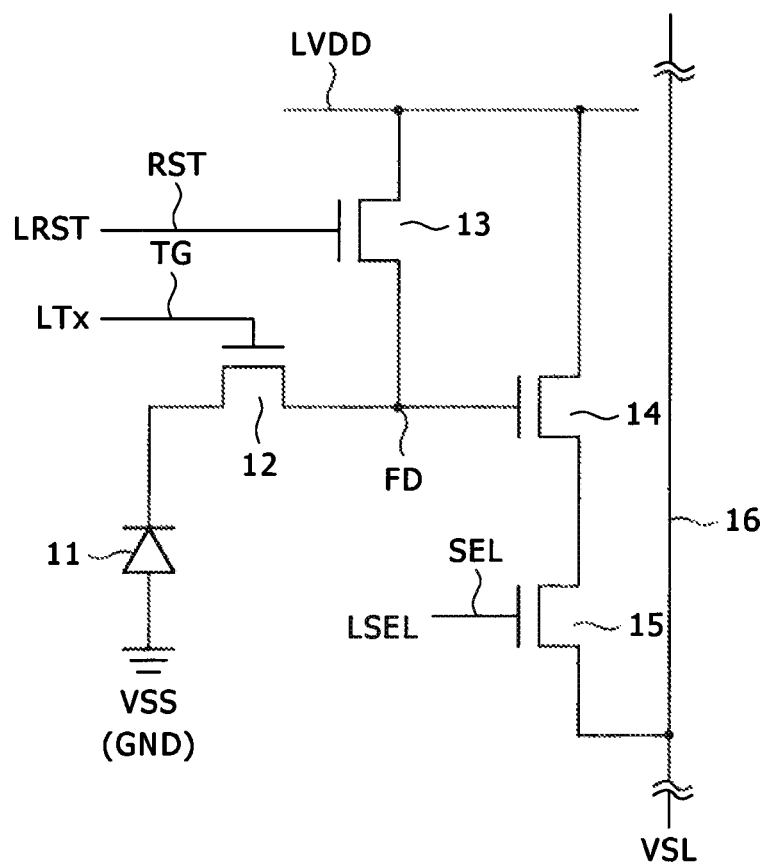
FIG. 1 is a diagram illustrating an exemplary picture element of a CMOS image sensor configured by four transistors.
Figure 2:
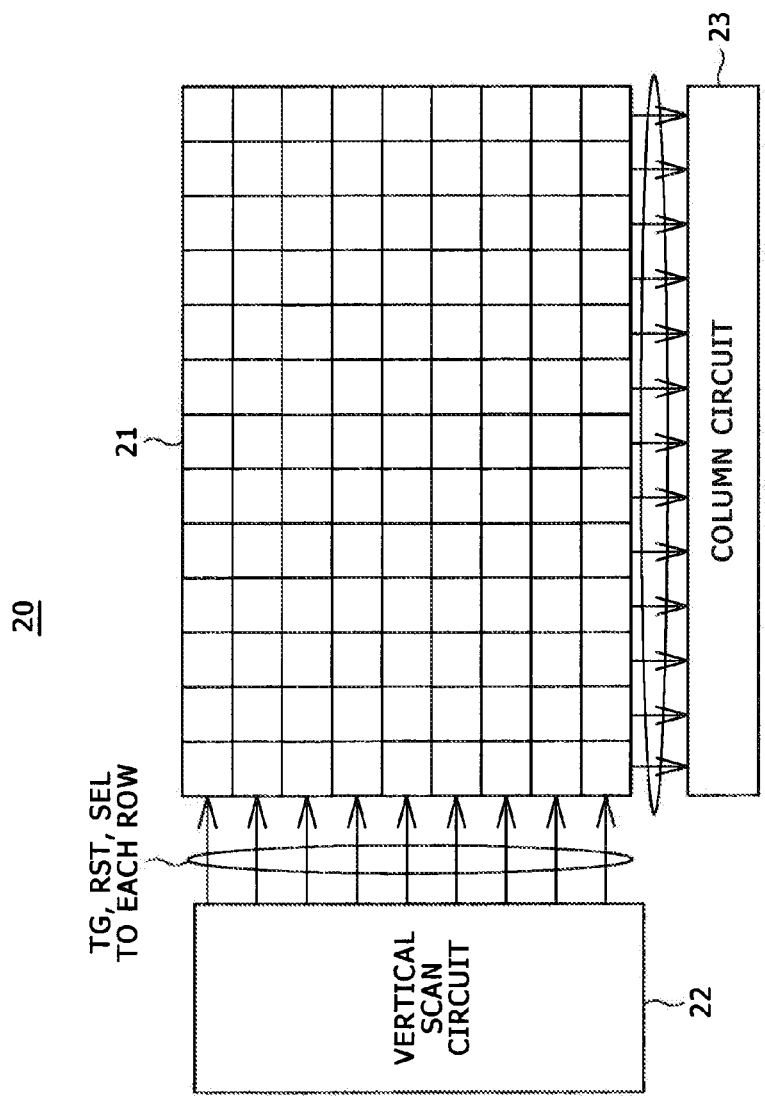
FIG. 2 is a diagram illustrating a general exemplary configuration of a CMOS image sensor (a solid-state imaging device) on which picture elements shown in FIG. 1 are arranged in a two-dimensional array.
Figure 3:
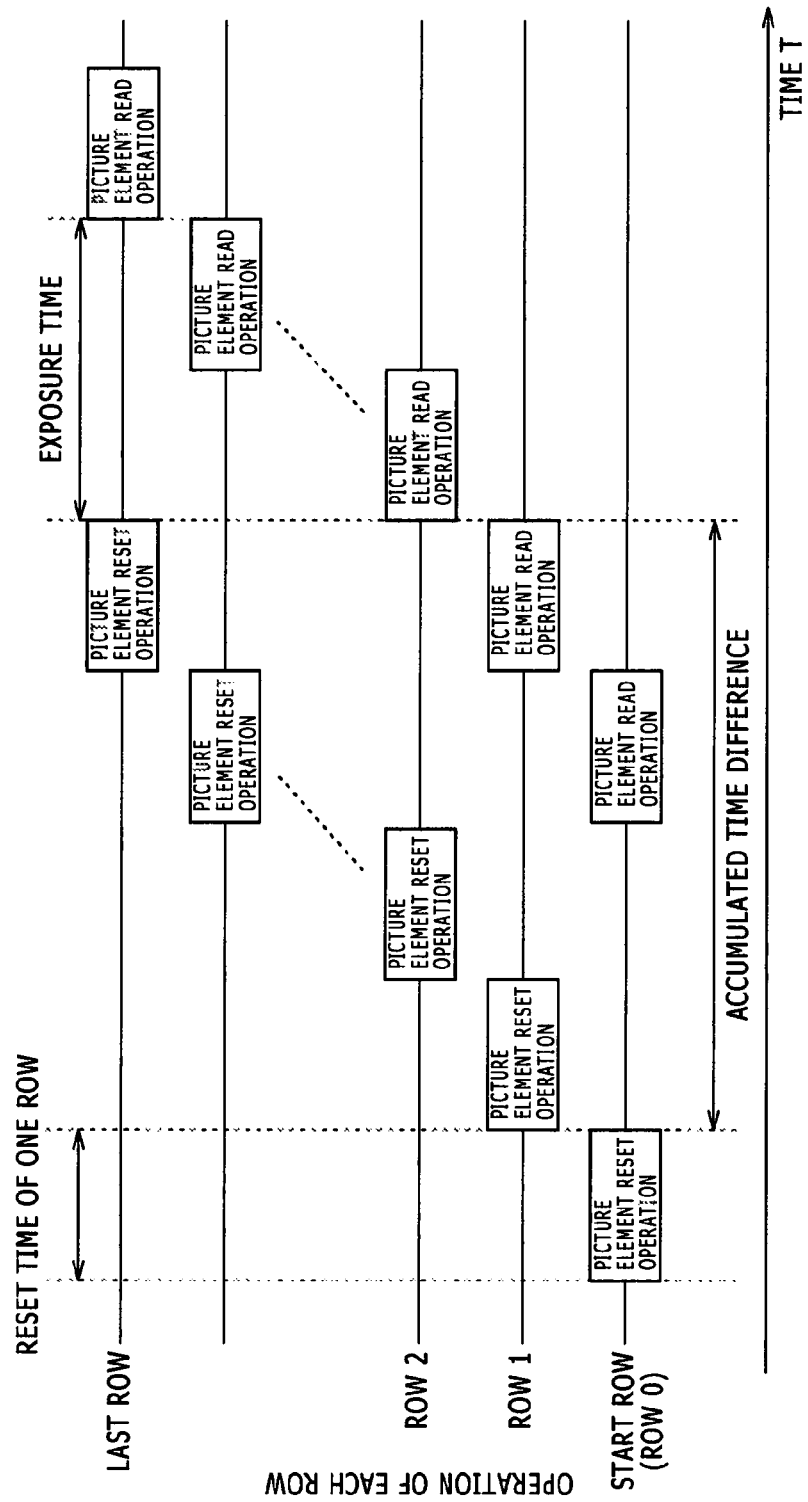
FIG. 3 is a timing chart indicative of a relation between a shutter operation and a horizontal period of a rolling shutter of a general CMOS image sensor.
Figure 4:
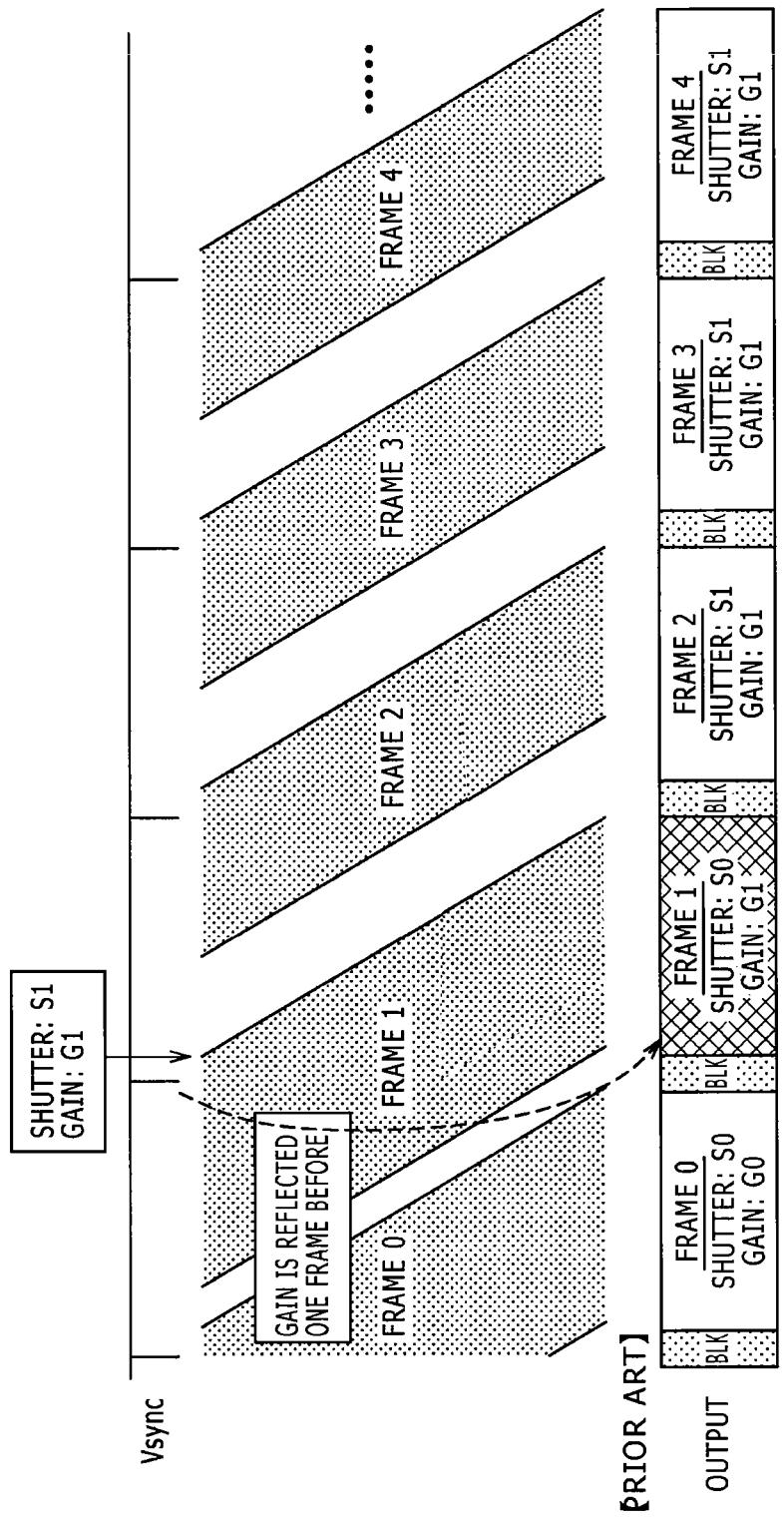
FIG. 4 is a diagram indicative of a problem that one invalid frame is generated.
Figure 5:
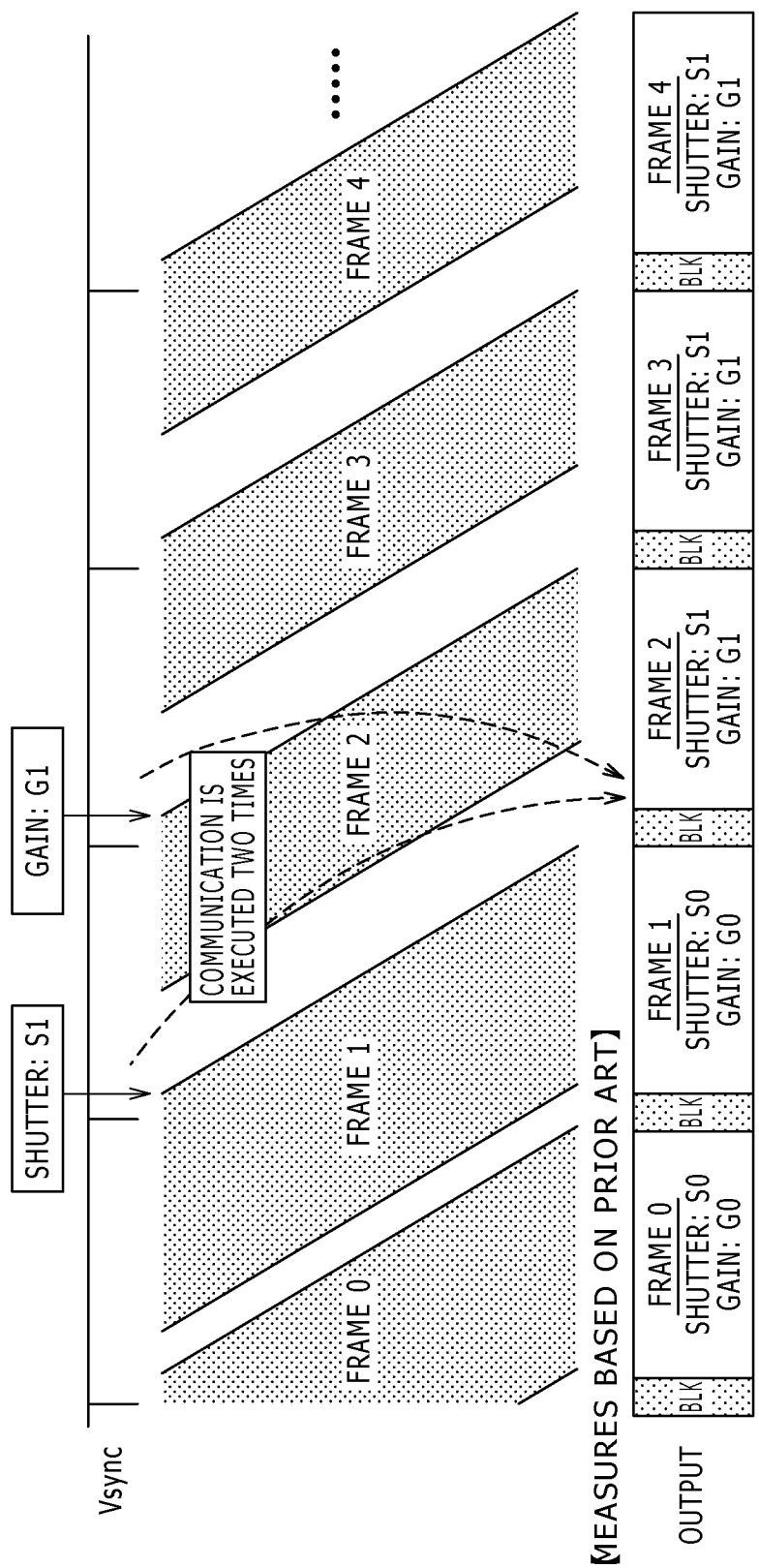
FIG. 5 is a diagram illustrating that, if gain setting is executed on a frame next to a frame on which shutter setting was executed, it is necessary to execute communication two times, one for shutter setting and the other for gain setting.
Figure 6:
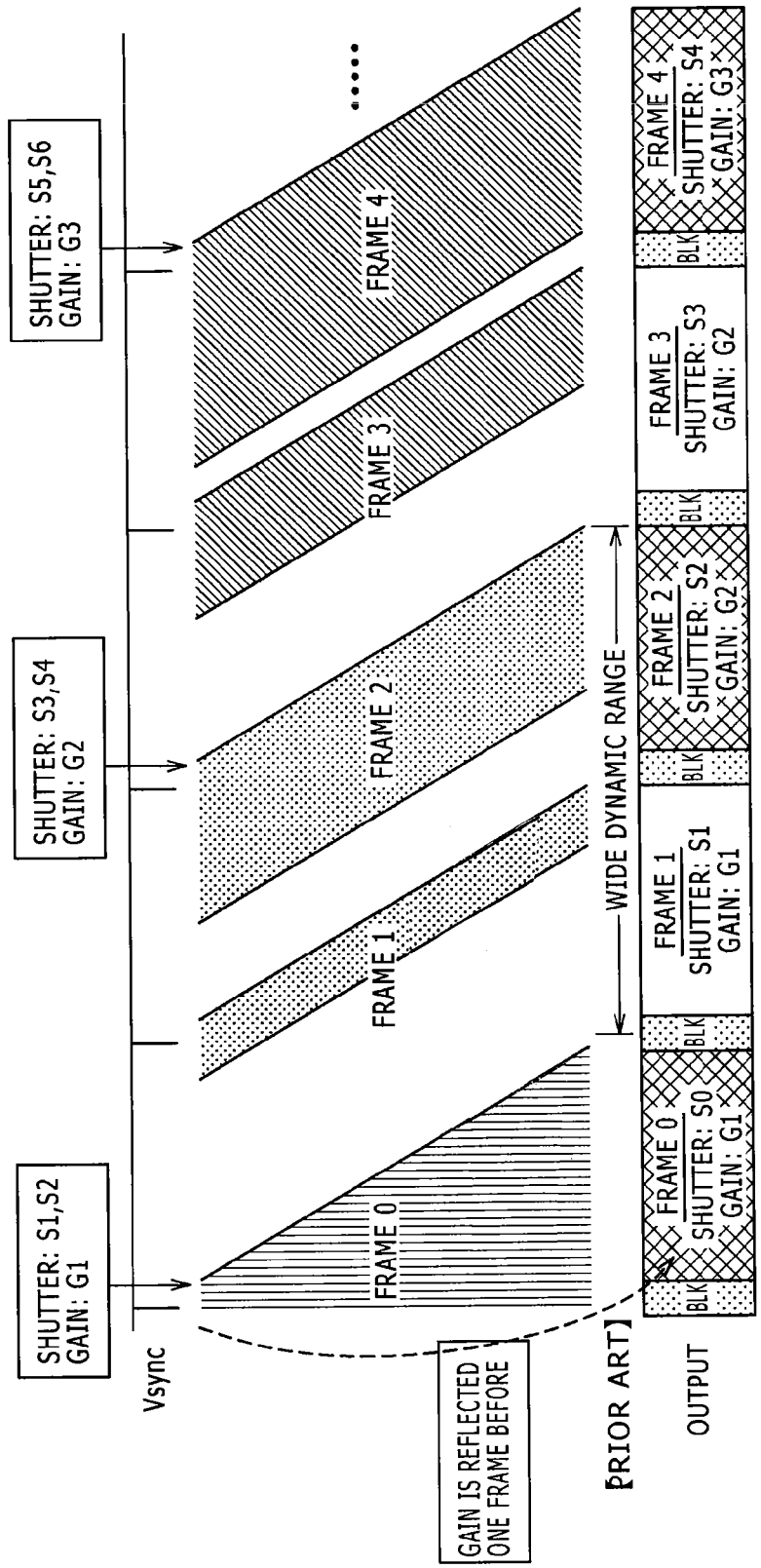
FIG. 6 is a diagram illustrating that a problem occurs that the previous one frame becomes an invalid frame if shutter setting and gain setting are executed on the start frame.
Figure 7:
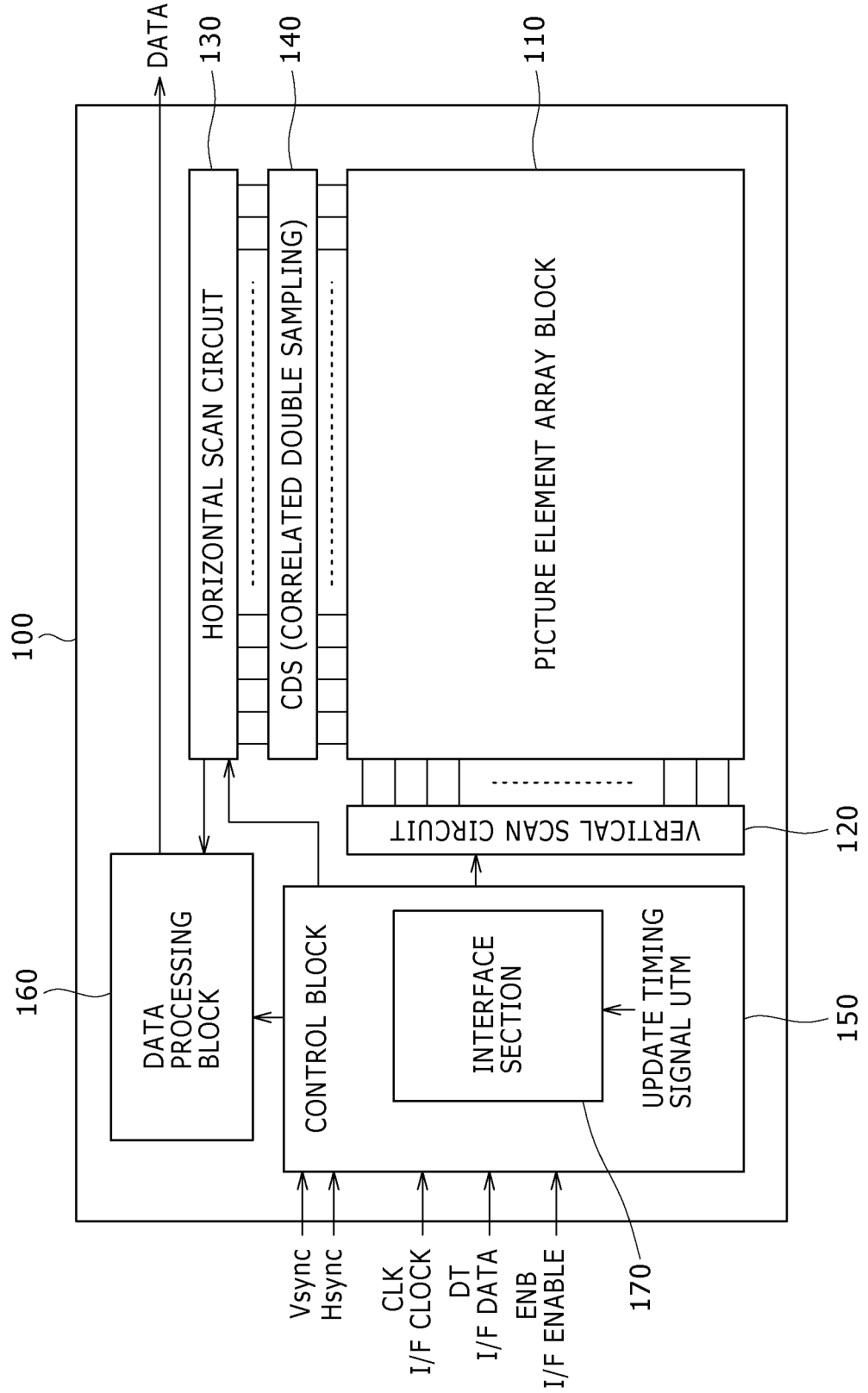
FIG. 7 is a diagram illustrating an exemplary configuration of a CMOS image sensor (a solid-state imaging device) associated with an embodiment of the present invention.

FIG. 7 is a diagram illustrating an exemplary configuration of a CMOS image sensor (a solid-state imaging device) associated with an embodiment of the present invention.

This image CMOS image sensor 100 has a picture element array block 110, a vertical scan circuit 120 as a picture element drive block, a horizontal scan circuit 130, a column read circuit 140, a control block 150, a data processing block 160, and an interface section 170.

On the picture element array block 110, a plurality of picture element circuits 110A are arranged two-dimensionally (in a matrix configuration).

Also, the solid state imaging device 100 has a configuration block for a control system for sequentially reading signals of the picture element array block 110.

To be more specific, on the solid-state imaging device 100, the control block 150 including an internal clock and the interface section 170, the vertical scan circuit 120 for controlling row addresses and row scan, the horizontal scan circuit 130 for controlling column addresses and column scan, and the column read circuit 140 are arranged.

The interface section 170 arranged in the control block 150 will be described later in detail.

Figure 8:
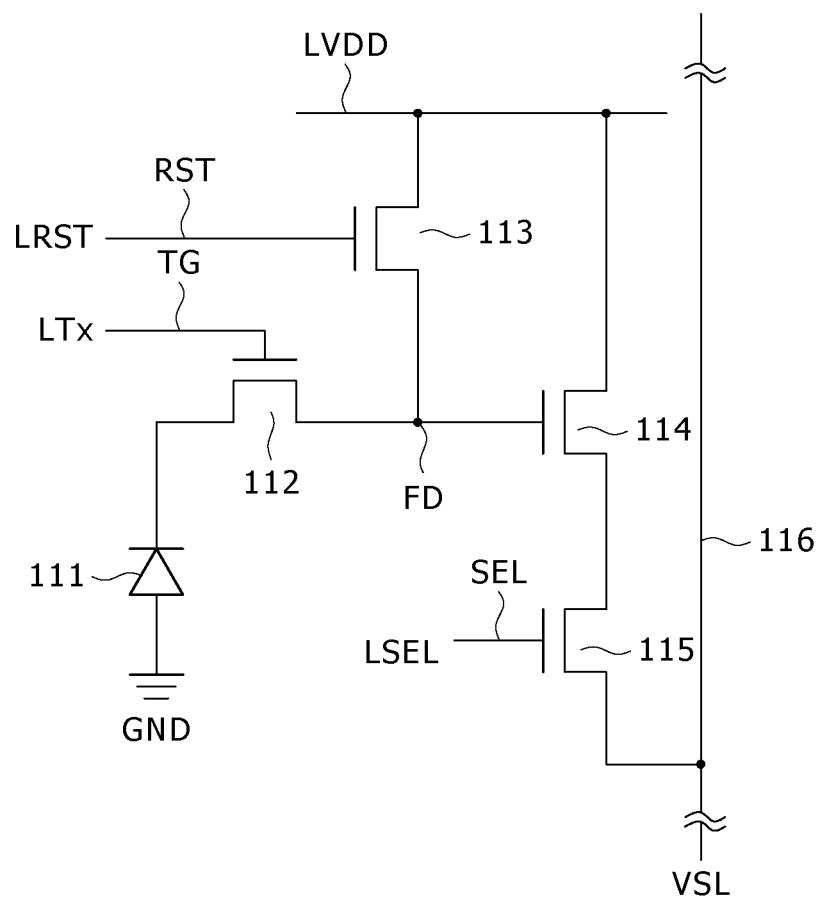
FIG. 8 is a diagram illustrating one example of a picture element of a CMOS image sensor configured by four transistors associated with the present embodiment.

FIG. 8 is a diagram illustrating one example of the CMOS image sensor configured by four transistors associated with the present embodiment.

This picture element circuit 110A has a photoelectric conversion element 111 based on a photodiode for example.

And, for this one photoelectric conversion element 111, the picture element circuit 110A has four transistors; a transfer transistor 112, a reset transistor 113, an amplification transistor 114, and a selection transistor 115 as active elements.

The photoelectric conversion element 111 photoelectrically converts an incident light into a charge (here, the electron) having an amount corresponding to the amount of the incident light.

The transfer transistor 112 is arranged between the photoelectric conversion element 111 and a floating diffusion FD that is an output node and a transmission signal TG that is a control signal is given to the gate (transfer gate) through a transfer control line LTx.

Consequently, the transfer transistor 112 transfers the electron obtained by photoelectric conversion by the photoelectric conversion element 111 to the floating diffusion FD.

The reset transistor 113 is connected between the power supply line LVDD and the floating diffusion FD and a reset signal RST that is a control signal is given to its gate through the reset control line LRST.

Consequently, the reset transistor 113 resets the potential of the floating diffusion FD to the potential of the power supply line LVDD.

The floating diffusion FD is connected with the gate of the amplification transistor 114. The amplification transistor 114 is connected to a signal line 116 via the selection transistor 115, thereby configuring a source follower with a constant current supply outside the picture element block.

Then, a select signal SEL that is a control signal corresponding to an address signal is given to the gate of the selection transistor 115 through a select control line LSEL, thereby turning on the selection transistor 115.

When the selection transistor 115 is turned on, the amplification transistor 114 amplifies the potential of the floating diffusion FD to output a voltage corresponding to its potential to the signal line 116. The voltage outputted from each picture element through the signal line 116 is outputted to the column read circuit 140.

These operations are simultaneously executed for each picture element for one row because the gates of the transfer transistor 112, the reset transistor 113, and the selection transistor 115 are each connected on a row basis.

The reset control lien LRST, the transfer control line LTx, and the select control line LSEL that are wired to the picture element array block 110 are wired as a set on a row basis of the picture element array.

These reset control line LRST, transfer control line LTx, and select control line LSEL are driven by the vertical scan circuit 120.

The vertical scan circuit 120 has a function of specifying rows at the time of executing an shutter operation and a read operation of the solid-state imaging device.

The vertical scan circuit 120 has a shutter drive processing function of the solid-state imaging device by reflecting shutter setting data by the interface section 170 and gain setting data associated with exposure ratio.

The column read circuit 140 receives read data of a picture element row read-controlled by the vertical scan circuit 120 and transfers this read data to the data processing block 160 of a subsequent stage via the horizontal scan circuit 130.

The column read circuit 140 has functions of executing signal processing such as correlated double sampling (CDS: Correlated Double Sampling) and so on.

The following describes a specific configuration and functions of the interface section 170 associated with the present embodiment.

The interface section 170 holds shutter setting data and gain setting data in accordance with clock CLK, data DT, and enable signal ENB and has functions of controlling timings for reflecting the shutter setting data and gain setting data onto the vertical scan circuit 120.

With prior-art technologies, if, when a gain has been set, the gain is reflected onto frames with the gain set, the reflection is made starting with one frame before, resulting in the occurrence of one invalid frame.

Therefore, the interface section 170 of the present embodiment includes a function of reflecting the gain one frame after upon gain setting, thereby preventing the occurrence of invalid frames.

The interface section 170 holds the gain setting data set from the outside and reflects the gain onto a next frame.

The interface section 170 has a function of detecting drive having a plurality of frames and automatically delaying the reflection of one frame gain.

In the interface section 170, if a timing of reflecting gain setting data is changed along with shutter setting data, the changing is executed not in separate register setting communication operations but in a same communication period, and no invalid frame occurs, the reflection being executed from the same frame.

Figure 9:
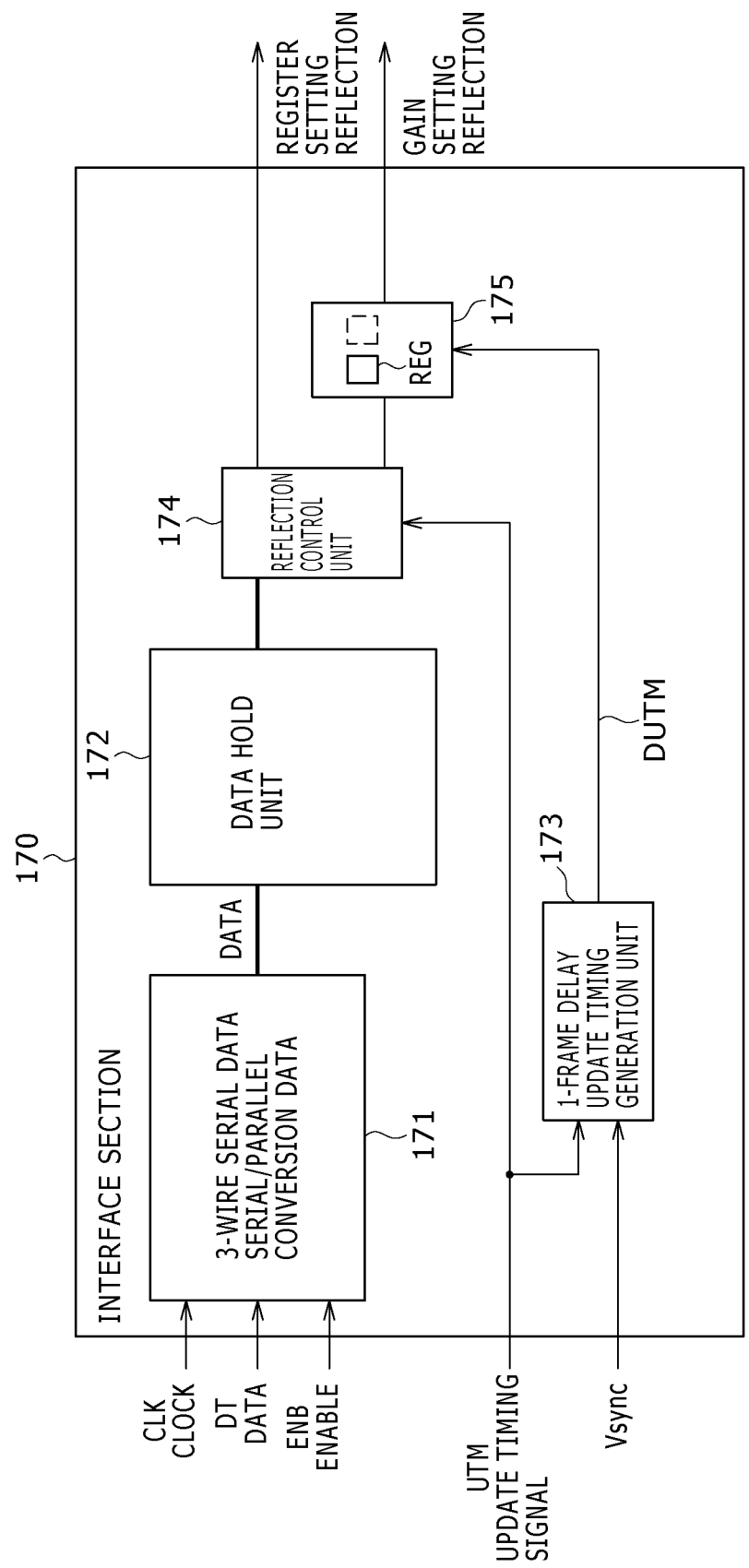
FIG. 9 is a circuit diagram illustrating an exemplary configuration of an interface section associated with an embodiment of the present invention.

FIG. 9 is a circuit diagram illustrating an exemplary configuration of an interface section associated with an embodiment of the present invention.

The interface section 170 shown in FIG. 9 has a serial/parallel conversion unit 171, a data hold unit 172, one-frame delay update timing generation unit 173, a reflection control bock 174, and a gain hold unit 175.

The serial/parallel conversion unit 171 converts three-line serial data into parallel data in accordance with clock CLK, data DT, and enable signal ENB received from the outside.

The data hold unit 172 holds the shutter setting data and gain setting data converted into parallel data.

The one-frame delay update timing generation unit 173 generates a delay update timing signal DUTM for one-frame delay in accordance with an update timing signal UTM given from the outside in synchronization with a vertical sync signal Vsync and outputs the generated delay update timing signal to the gain hold unit 175.

The reflection control unit 174 supplies the shutter setting data STR held in the data hold unit 172 to the vertical scan circuit 120 and so on of the subsequent stage in synchronization with the updating timing signal UTM given from the outside and the gain setting data to the gain hold unit 175.

The gain hold unit 175 has one or more registers REG as a latch and, by receiving the delay update timing signal DUTM for one-frame delay, holds the supplied gain setting signal for one frame, supplying the gain setting data to the vertical scan circuit 120 and so on in the subsequent stage.

Figure 10:
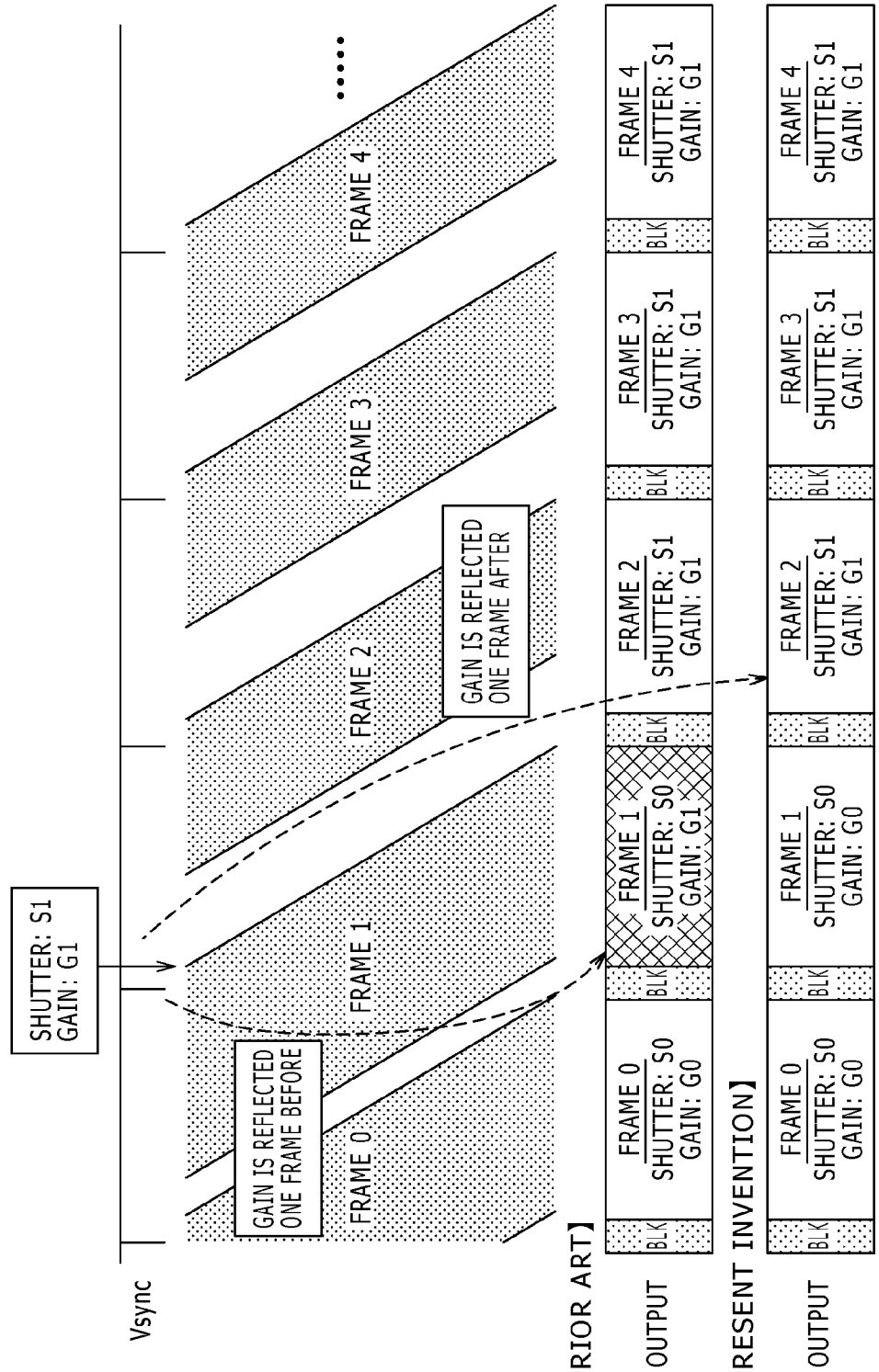
FIG. 10 is a timing chart indicative of a comparison between basic drive operations of the present embodiment and a related-art technology.

FIG. 10 is a timing chart indicative of a comparison between the basic drives of the present embodiment and the prior-art.

Figure 11:
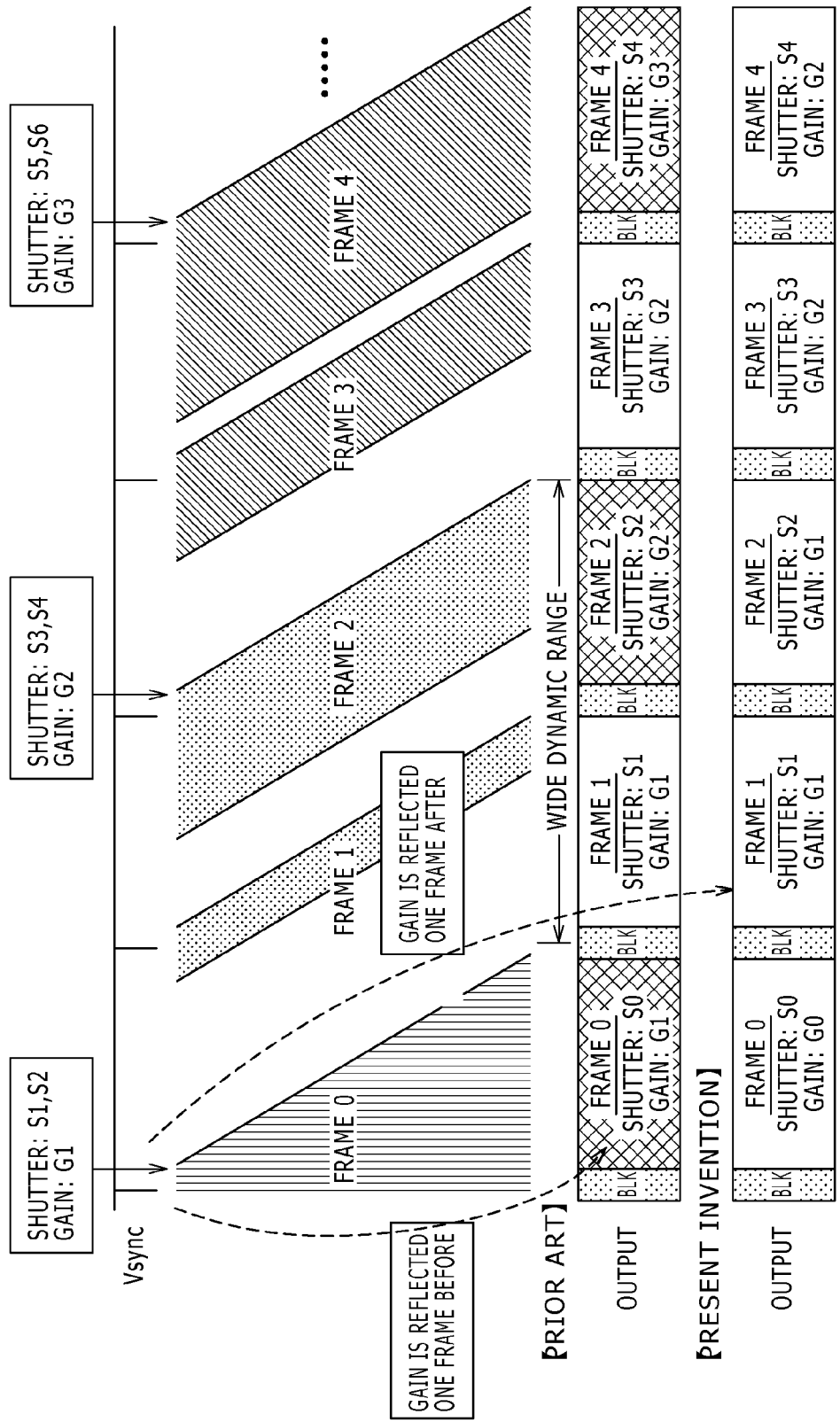
FIG. 11 is a timing chart indicative of a comparison between multiple frame drive operations of the present embodiment and a prior-art technology.

FIG. 11 is a timing chart indicative of a comparison between the cases of multiple-frame drives of the present embodiment and the prior-art.

In the interface section 170, data DT entered from the outside in three-line serial is converted from serial data into parallel data by the serial/parallel conversion unit 171 to be held in the data hold unit 172.

And, the held data is reflected onto the inside of the CMOS image sensor 100 by a delay update timing signal DUTM generated inside, thereby making the control block 150 control each functional block, the vertical scan circuit 120 and so on for example.

For the operation of reflecting the data held in the data hold unit 172 onto the inside, only an operation for reflecting gain setting is delayed.

The setting data held on the data hold unit 172 is not reflected onto the inside by an update timing UTM for only gain setting, but, as shown in FIG. 10, the setting data is reflected onto the inside by a delay update timing signal DUTM delay by one frame by the one-frame delay update timing generation unit 173.

Also, as shown in FIG. 11, if a plurality of frames are required as with wide dynamic range drive, the above-mentioned means can prevent the occurrence of invalid frames.

However, in the case of drive for changing gain setting for each frame, only the reflection by the update timing delay by one frame reflects the data of a register of the gain communicated at that time.

Hence, in order to delay by one frame the reflection of gain setting in such a drive, a register REG that is a latch is arranged in the gain hold unit 175 in the present embodiment, thereby executing the reflection by one-frame delay update timing.

Consequently, if gain setting is executed for each frame, it is possible to prevent the occurrence of invalid frames.

Figure 12:
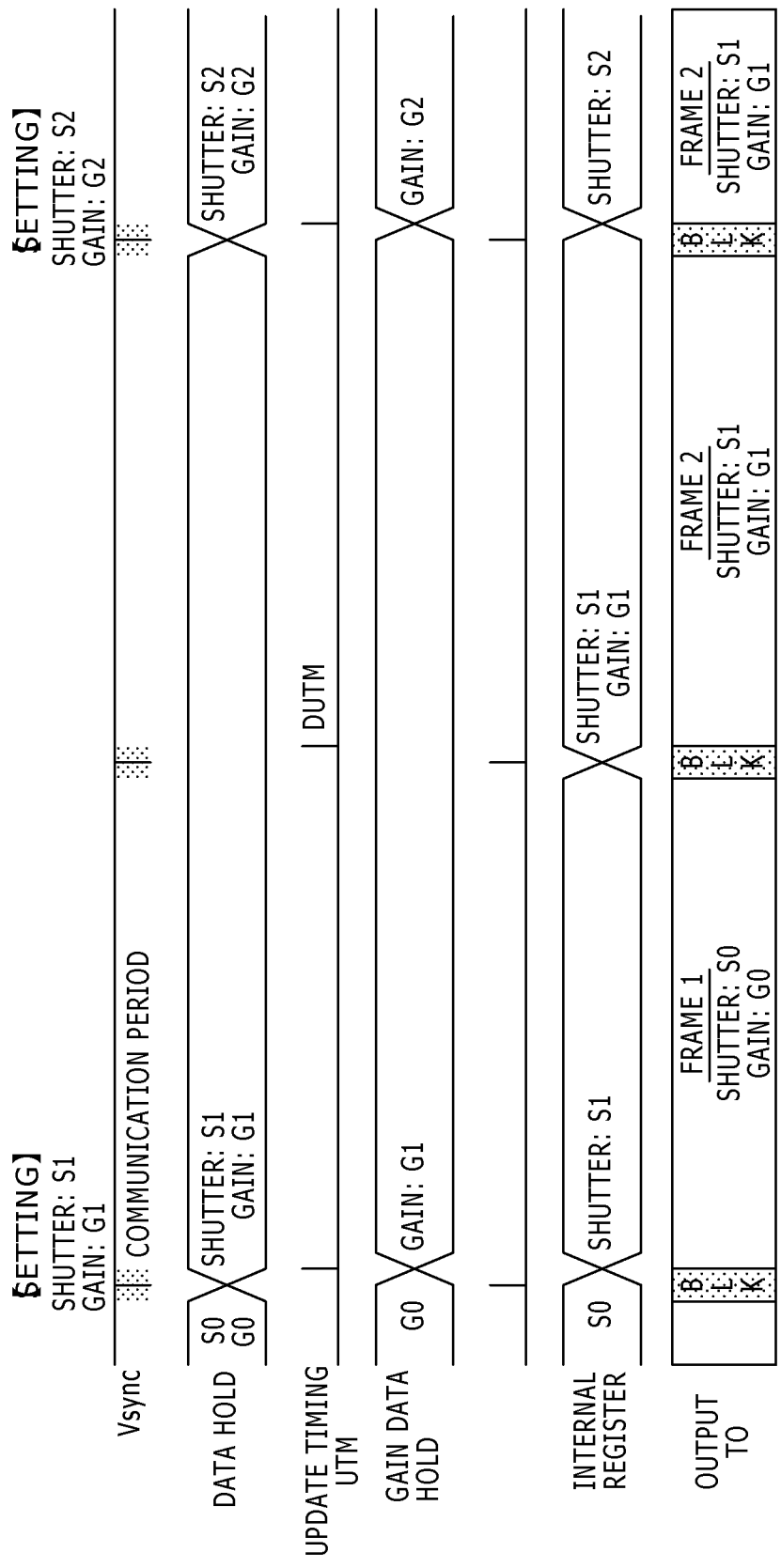
FIG. 12 is a timing chart indicative of shutter setting and gain setting processing associated with the present embodiment.

FIG. 12 is a timing chart for describing the shutter setting and gain setting processing associated with the present embodiment.

Shutter setting value S1 and gain setting value G1 set in communication period T1 are held in the data hold unit 172.

Then, the reflection is executed onto the control internal register REG through the reflection control unit 174 by an update timing signal UTM, but, at this moment, only shutter setting value S1 is reflected onto the inside.

Gain setting value G1 is updated into the internal register through the gain hold unit 175 by the delay update timing signal DUTM one frame after.

Then, the updated gain setting value is outputted to an output terminal TO.

The above-mentioned technique realizes the reflection of gain setting without causing invalid frames.

As described above, according to the present embodiment, an updating timing with an updating timing to the inside delayed by one frame is arranged, thereby enabling to delay the reflection of gain setting made from the outside by one frame.

Also, it is not necessary, in the normal drive, to execute register communication two times.

Further, the arrangement of a gain-only internal latch allows the gain reflection delayed by one frame if gain setting change is made from the outside for each frame, thereby preventing the occurrence of invalid frames.

Figure 13:
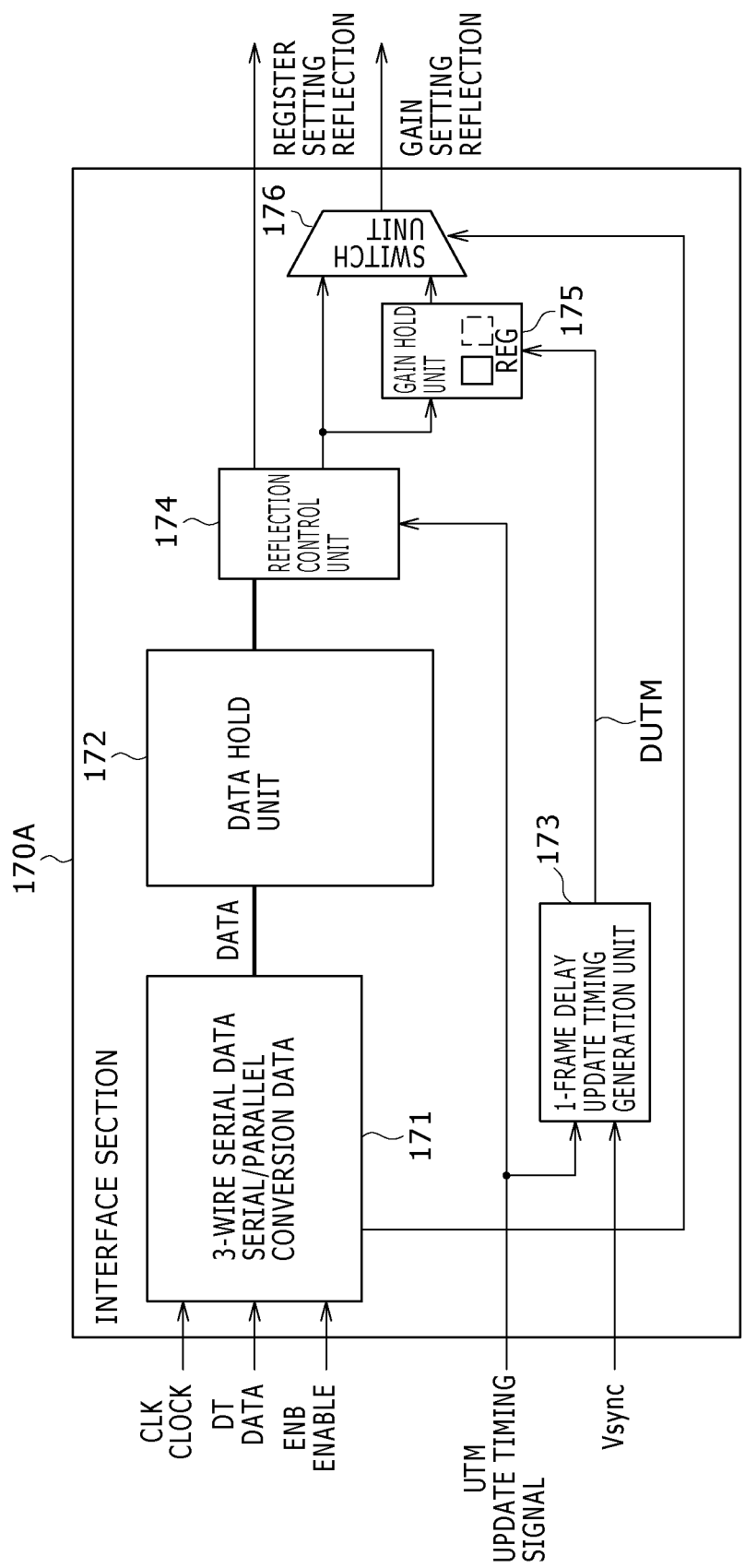
FIG. 13 is a diagram illustrating an exemplary configuration for switching between functions of delaying and not delaying an update timing by one frame of the interface section associated with the present embodiment.

It should be noted that the interface section 170 has been described by use of an example in which only the function of delaying the reflection of gain setting by one frame is arranged; it is also practicable to provide a configuration in which a function of delaying update timing by one frame and a function of not delaying are switched therebetween as shown in FIG. 13 for example.

FIG. 13 is a diagram illustrating an exemplary configuration in which a function of delaying update timing by one frame and a function of not delaying are switched therebetween of an interface section associated with the present invention.

The interface section 170 shown in FIG. 13 has a switch unit 176 in addition to the configuration shown in FIG. 9.

The switch unit 176 switches between gain setting data not delay by one frame by a reflection control unit 174 by switch signal S171 by a serial/parallel conversion unit 171A and gain setting data delay one by frame by a gain hold unit 175 and outputs the selected gain setting data.

According to the configuration shown in FIG. 13, the switching between the function of delay updating time by one frame and the function of not delaying provides the compatibility with the case where the embodiment is used along with the prior-art gain setting.

It should be noted that the CMOS image sensor associated with every embodiment may be configured, but not exclusively, as a CMOS image sensor installing an analog/digital conversion apparatus (hereafter abbreviated as ADC (Analog digital converter)) of column parallel type for example.

Figure 14:
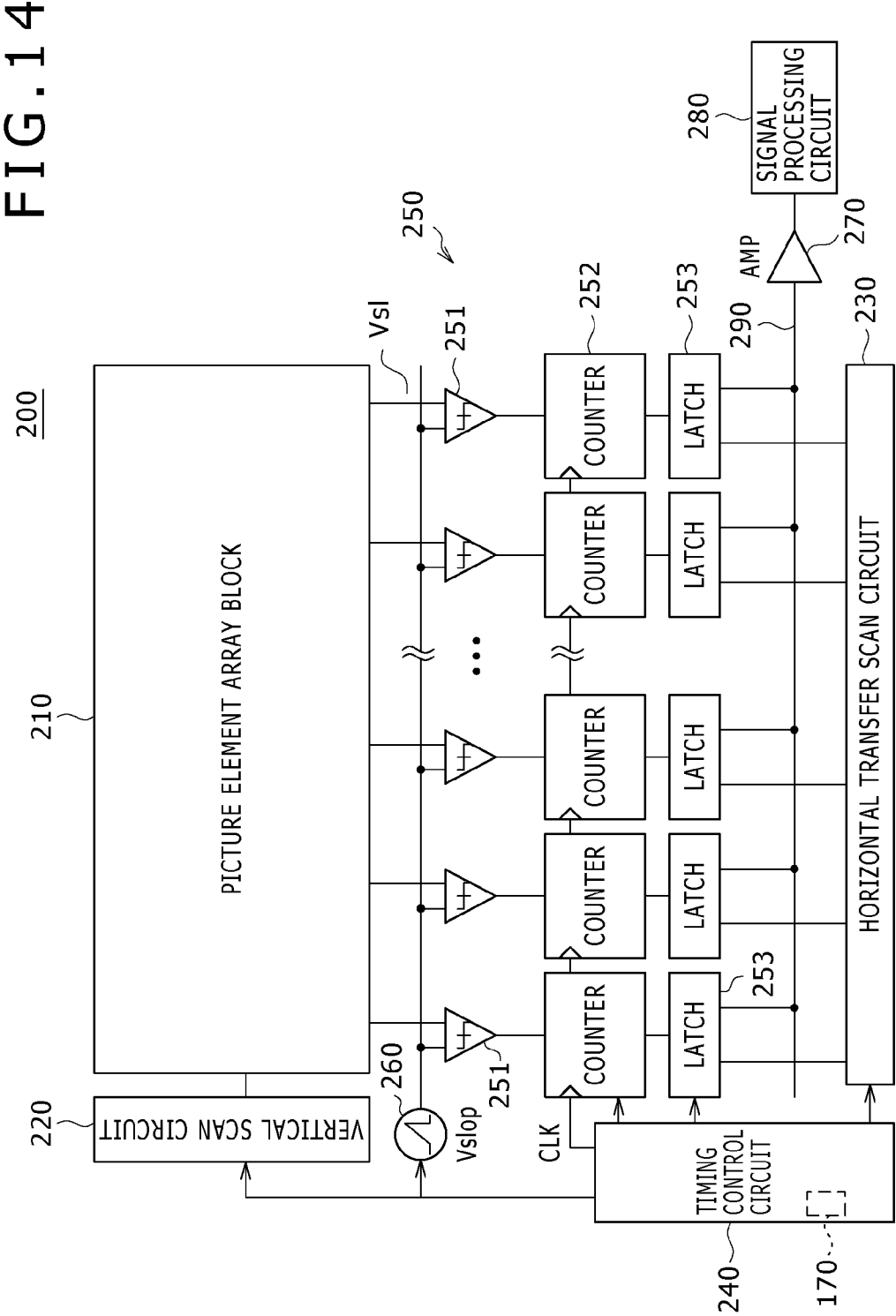
FIG. 14 is a block diagram illustrating an exemplary configuration of a column parallel ADC-mounted solid-state imaging device (CMOS image sensor) associated with the present embodiment.

FIG. 14 is a block diagram illustrating an exemplary configuration of a column parallel ADC installed solid-state imaging device (CMOS image sensor) associated with the present embodiment.

This solid-state imaging device 200 has a picture element array block 210 that is a imaging block, a vertical scan circuit 220 that is a picture element drive block, a horizontal transfer scan circuit 230, and a timing control circuit 240, as shown in FIG. 14.

Further, the solid-state imaging device 200 has an ADC group 250, a digital-analog conversion apparatus (hereafter abbreviated as a DAC (Digital Analog converter)) 260, an amplification circuit (S/A) 270, and a signal processing circuit 280.

The picture element array block 210 includes photodiodes and in-picture-element amplifiers and is configured such that picture elements as shown in FIG. 8 for example are arranged in a matrix manner (a row manner).

Also, in the solid-state imaging device 200, the following circuits are arranged for control circuits for sequentially reading signals of the picture element array block 210.

To be more specific, in the solid-state imaging device 200, a timing control circuit 240 for generating an internal clock as a control circuit, a vertical scan circuit 220 for controlling row addresses and row scan, and a horizontal transfer scan circuit 230 for controlling column addresses and column scan are arranged.

And, a control block 150 in which the timing control circuit 240 includes interface sections 170, 170A described with reference to FIG. 7 through FIG. 13 is arranged.

In the ADC group 250, ADCs having a comparator 251, a counter 252, and a latch 253 are arranged for a plurality of columns.

The comparator 251 compares reference voltage Vslop that is a ramp waveform (RAMP) obtained by gradually changing a reference voltage generated by the DAC 260 with an analog signal obtained from picture elements for each row line via vertical signal lines.

The counter 252 counts a comparison time of the comparator 251.

The ADC group 250 has a function of converting n-bit digital signal and is arranged for each vertical signal line (column line), thereby configuring a column parallel ADC block.

An output of each latch 253 is connected to a horizontal transfer line 290 of 2n-bit width for example.

And, 2n amplification circuit 270 corresponding to the horizontal transfer line 290 and the signal processing circuit 280 are arranged.

In the ADC group 250, an analog signal (a potential Vsl) read to a vertical signal line is compared by the comparator 251 arranged for each column with a reference voltage Vslop (a slope waveform having a certain slop changing linearly).

At this moment, the counter 252 arranged for each column like the comparator 251 is operating and the potential Vslop having a ramp waveform and a counter value change in a one to one correspondence, thereby converting the potential (analog signal) Vsl of the vertical signal line into a digital signal.

The change in the reference voltage Vslop converts the change in voltage to the change in time and, by counting that time by period (clock), the conversion into a digital value is executed.

And, when the analog electrical signal Vsl and the reference voltage Vslop cross each other, the output of the comparator 251 is inverted to stop the input clock of the counter 252, thereby completing the AD conversion.

After the end of the above-mentioned AD conversion period, the data held in the latch 253 is entered by the horizontal transfer scan circuit 230 into the signal processing circuit 280 via the horizontal transfer line 290 and the amplification circuit 270, thereby generating a two-dimensional image.

Thus, the column parallel output processing is executed.

The solid-state imaging device having the above-mentioned effects is applicable to imaging devices for use in digital cameras and video cameras.

Figure 15:
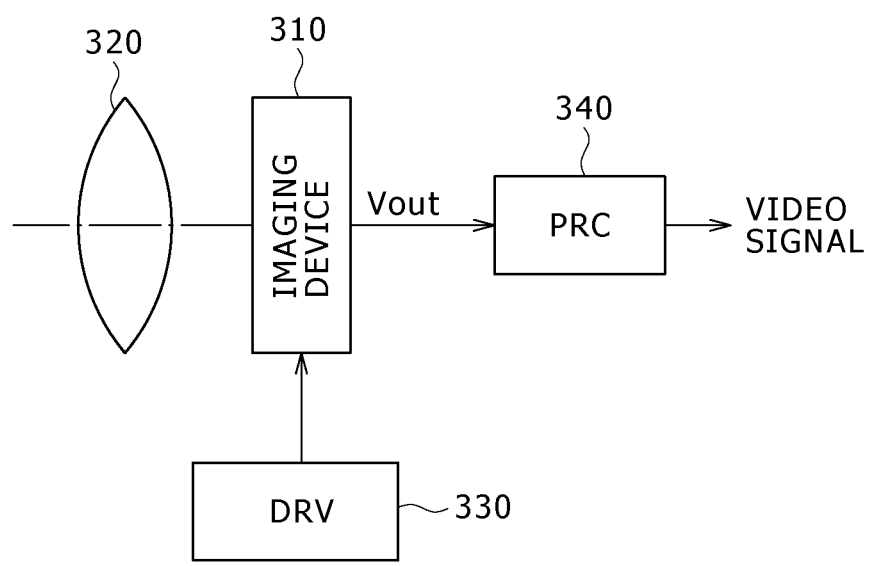
FIG. 15 is a diagram illustrating an exemplary configuration of a camera system to which the solid-state imaging device associated with an embodiment of the present invention is applied.

FIG. 15 is a diagram illustrating an exemplary configuration of a camera system to which the solid-state imaging device associated with embodiments of the present invention is applied.

This camera system 300 has an imaging device 310 to which the CMOS image sensor (slid-state imaging device) 100, 200 associated with the present embodiment is applicable, an optical system for guiding an incident light (forming an image of a subject) to a picture element area of this imaging device 310, a lens 320 for forming an incident light (a image light) onto a taken image, for example, a drive circuit (DRV) 330 for driving the imaging device 310, and a signal processing circuit (PRC) 340 for processing an output signal of the imaging device 310 as shown in FIG. 15.

The drive circuit 330 has a timing generator (not shown) for generating various timing signals including a start pulse and a clock pulse for driving circuits in the imaging device 310, thereby driving the imaging device 310 by a predetermined timing signal.

Also, the signal processing circuit 340 executes predetermined signal processing on an output signal of the imaging device 310.

An image signal processed by the signal processing circuit 340 is recorded to a recording media such as a memory for example. The image information recorded to a recording media is hard-copied by a printer or the like. Also, the image signal processed by the signal processing circuit 340 is shown on a monitor based on a liquid crystal display or the like as a moving image.

As described above, in the imaging device such as a digital still camera or the like, the above-mentioned CMOS image sensor 100, 200 may be installed to realize a low power consuming, precision camera as the imaging device 310.

EXPLANATION OF REFERENCE SYMBOLS

100 . . . CMOS image sensor, 110 . . . Picture element array block, 110A . . . Picture element, 111 . . . Photoelectric conversion element, 112 . . . Transfer transistor, 113 . . . Reset transistor, 114 . . . Amplification transistor, 115 . . . Selection transistor, 120 . . . Vertical scan circuit (picture element drive block), 130 . . . Horizontal scan circuit, 140 . . . Column read circuit, 150 . . . Control block, 160 . . . Data processing block, 170 . . . Interface section, 171 . . . Serial/parallel conversion unit, 172 . . . Data hold unit, 173 . . . One-frame delay update timing generation unit, 174 . . . Reflection control unit, 175 . . . Gain hold unit, 176 . . . Switch unit, 200 . . . Solid-state imaging device, 210 . . . Picture element array block, 220 . . . Vertical scan circuit, 230 . . . Horizontal transfer scan circuit, 240 . . . Timing control circuit, 250 . . . ADC group, 260 . . . DAC, 270 . . . Amplification circuit (S/A), 280 . . . Signal processing circuit, 300 . . . Camera system, 310 . . . Imaging device, 320 . . . Lens, 330 . . . Drive circuit, 340 . . . Signal processing circuit

The invention claimed is:

1. A solid-state imaging device comprising:
a picture element block on which are provided a plurality of picture element circuits having features for converting an optical signal into an electrical signal;
a picture element drive block that is drivable so as to execute a shutter operation of the picture element block and a read operation; and
an interface section that controls a timing for reflecting a shutter setting and a gain setting onto at least the picture element drive block;
wherein the interface section includes,
a function of automatically reflecting the gain setting onto a next frame after one frame in which a gain is set,
a data hold unit configured to hold the shutter setting data and the gain setting data,
a delay update timing generation unit configured to receive an update timing signal and to generate a one-frame delay update timing signal,
a gain hold unit configured to receive the delay update timing signal and to output the gain setting data to be supplied with a one-frame delay, and
a reflection control unit configured to receive the update timing signal and to directly output the shutter setting data held in the data hold unit and supply the gain setting data to the gain hold unit.

2. The solid-state imaging device according to claim 1, wherein the interface section has functions of detecting drive of a plurality of frames and delaying the reflection of the gain setting by one frame.

3. The solid-state imaging device according to claim 1, wherein the interface section has a switch unit configured to execute selection between executing the reflection of a gain setting value by delaying by one frame and executing the reflection without delaying by one frame.

4. The solid-state imaging device according to claim 1, wherein the function of the interface section only delays an operation to reflect the gain when the gain is set.

5. A solid-state imaging device comprising:
a picture element block on which are provided a plurality of picture element circuits having features for converting an optical signal into an electrical signal;
a picture element drive bock that is drivable so as to execute a shutter operation of the picture element block and a read operation; and
an interface section that controls a timing for reflecting the shutter setting and gain setting onto at least the picture element drive block;
wherein the interface section includes,
a function of automatically reflecting a gain onto a frame next after one frame in which the gain is set;
a switch unit configured to execute selection between executing the reflection of a gain setting value by delaying by one frame and executing the reflection without delaying by one frame;
a data hold unit configured to hold shutter setting data and gain setting data supplied from the outside;
a delay update timing generation unit configured to receive an update timing signal and to generate a one-frame delay update timing signal;
a gain hold unit configured to receive the delay update timing signal and to output the gain setting value to be supplied with a one-frame delay;
a reflection control unit configured to receive the update timing signal and to directly output a shutter setting value and the gain setting value held in the data hold unit and supply the gain setting value to the gain hold unit; and
a switch unit configured to selectively output a gain setting value not delayed that is output from the reflection control unit or a gain setting value delayed by the gain hold unit.

6. A camera system comprising:
a solid-state imaging device;
an optical system for forming a subject image on the imaging device; and
a signal processing circuit configured to process an output image signal of the imaging device;
wherein,
the solid-state imaging device includes,
a picture element block on which are provided a plurality of picture element circuits having features for converting an optical signal into an electrical signal and accumulating the electrical signal, a picture element drive block that is drivable so as to execute a shutter operation of the picture element block and a read operation, and an interface section that controls a timing for reflecting a shutter setting and a gain setting onto at least the picture element drive block, and the interface section includes, a function of automatically reflecting a gain onto a next frame after one frame in which the gain is set, a data hold unit configured to hold shutter setting data and gain setting data, a delay update timing generation unit configured to receive an update the timing signal and to generate a one-frame delay update timing signal, a gain hold unit configured to receive the delay update timing signal and to output the gain setting data to be supplied with a one-frame delay, and a reflection control unit configured to receive the update timing signal and to directly output the shutter setting data held in the data hold unit and supply the gain setting data to the gain hold unit.

7. The camera system according to claim 6, wherein the function of the interface section only delays an operation to reflect the gain when the gain is set.

* * * * *